United States Patent
Fan

(10) Patent No.: US 9,230,161 B2
(45) Date of Patent: Jan. 5, 2016

(54) MULTIPLE LAYER BLOCK MATCHING METHOD AND SYSTEM FOR IMAGE DENOISING

(71) Applicant: Xerox Corporation, Norwalk, CT (US)

(72) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 83 days.

(21) Appl. No.: 14/099,376

(22) Filed: Dec. 6, 2013

(65) Prior Publication Data

US 2015/0161436 A1    Jun. 11, 2015

(51) Int. Cl.
*G06K 9/62* (2006.01)
*G06K 9/00* (2006.01)
*G06T 5/00* (2006.01)

(52) U.S. Cl.
CPC .......... *G06K 9/00389* (2013.01); *G06K 9/6267* (2013.01); *G06T 5/002* (2013.01); *G06T 2207/20016* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 4,538,227 A | 8/1985 | Toraichi et al. | |
| 6,272,255 B2 | 8/2001 | de Queiroz et al. | |
| 6,275,620 B2 | 8/2001 | de Queiroz et al. | |
| 6,334,001 B2 | 12/2001 | de Queiroz et al. | |
| 6,373,981 B1 | 4/2002 | de Queiroz et al. | |
| 7,652,788 B2 | 1/2010 | Foi et al. | |
| 8,565,581 B2 | 10/2013 | Curcio et al. | |
| 2007/0041439 A1 | 2/2007 | Bilcu et al. | |
| 2007/0297019 A1 | 12/2007 | Foi et al. | |
| 2009/0067742 A1* | 3/2009 | Lim et al. | 382/263 |
| 2012/0201436 A1* | 8/2012 | Oakley et al. | 382/128 |
| 2013/0071025 A1* | 3/2013 | Jang et al. | 382/167 |
| 2013/0094733 A1 | 4/2013 | Nosato et al. | |
| 2013/0107006 A1 | 5/2013 | Hong et al. | |
| 2014/0219552 A1* | 8/2014 | Porikli et al. | 382/155 |

OTHER PUBLICATIONS

Fan, Zhigang. "Image denoising with multiple layer block matching and 3D filtering." IS&T/SPIE Electronic Imaging. International Society for Optics and Photonics, 2014.*
R.C Gonzalez, R.E. Woods., "Digital Image Processing", Prentice Hall, New Jersey, 2008.
K. Dabov et al., "Image denoising by sparse 3-D transform-domain collaborative filtering", IEEE Transactions on Image Processing, vol. 16, No. 8, pp. 2080-2095, Aug. 2007.
K. Dabov et al., "A Nonlocal and Shape-Adaptive Transform-Domain Collaborative Filtering", Proc. 2008 Int. Workshop on Local and Non-Local Approximation in Image Processing, LNLA 2008, Lausanne, Switzerland, 2008.
K. Dabov et al., "BM3D Image Denoising with Shape-Adaptive Principal Component Analysis", Proc. Workshop on Signal Processing with Adaptive Sparse Structured Representations (SPARS'09), Saint-Malo, France, Apr. 2009.

(Continued)

*Primary Examiner* — Utpal Shah
*Assistant Examiner* — Narek Zohrabyan
(74) *Attorney, Agent, or Firm* — Fay Sharpe LLP

(57) ABSTRACT

This disclosure provides a method, system and computer program product for denoising an image by extending a Block Matching and 3D Filtering algorithm to include decomposition of high contrast image blocks into multiple layers that are collaboratively filtered. According to an exemplary method, the high contrast image blocks are decomposed into a top layer, a bottom layer and a mask layer.

25 Claims, 6 Drawing Sheets

(56) References Cited

OTHER PUBLICATIONS

Y. S. Zhang et al., "BM3D Denoising Algorithm with Adaptive Block-Match Thresholds", 2012, Applied Mechanics and Materials, vol. 229-231, pp. 1715-1720, Nov. 2012.

O. Pakdelazar et al., "Improvement of BM3D algorithm and Employment to satellite and CFA images Denoising", International Journal of Information Sciences and Techniques (IJIST) vol. 1, No. 3, pp. 23-33, Nov. 2011.

M. Poderico et al., "Sigmoid Shrinkage for BM3D denoising algorithm", 2010 IEEE International Workshop on Multimedia Signal Processing (MMSP), pp. 423-426.

Ricardo De Queiroz et al., "Mixed Raster Content (MRC) Model for Compound Image Compression", Visual Communications and Image Processing '99, Dec. 1998.

Nobuyuki Otsu, "A threshold selection method from gray-level histograms". IEEE Trans. Sys., Man., Cyber. 9 (1): 62-66, 1979.

Marc Lebrun, "An Analysis and Implementation of the BM3D Image Denoising Method", Image Processing on Line, Aug. 8, 2012.

Katkovnik et al., "From local kernel to nonlocal multiple-model image denoising", 32 pages, Published Jul. 25, 2009, Springer Science + Business Media, LLC 2009.

\* cited by examiner

MULTIPLE LAYER BLOCK MATCHING METHOD AND SYSTEM FOR IMAGE DENOISING

BACKGROUND

This disclosure relates to a method, system and computer program product for image denoising. According to an exemplary embodiment, MLBM3D (Multiple Layer Block Matching 3 Dimensional Filter) is provided for collaboratively filtering high contrast image patches, i.e. image blocks.

Image denoising has long been a topic of interest for the image processing community. See R. C Gonzalez, R. E. Woods., Digital Image Processing, Prentice Hall, N.J., 2008 and Vladimir Katkovnik, Alessandro Foi, Karen Egiazarian, Jaakko Astola, "From local kernel to nonlocal multiple-model image denoising", Journal International Journal of Computer Vision, Vol 86, Issue 1, pp 1-32 January 2010. Traditionally, image denoising is performed as a local pointwise operation, e.g. local smoothing. In recent years, there have been two emerging trends. See R. C Gonzalez, R. E. Woods., Digital Image Processing, Prentice Hall, N.J., 2008. First, non-local dependency existing in natural images has been exploited. Second, multiple point estimation methods are being investigated. Combining non-local processing and multiple point operations, Block Matching and 3-D Filtering (BM3D) algorithm, see K. Dabov, A. Foi, V. Katkovnik, and K. Egiazarian, "Image denoising by sparse 3-D transform-domain collaborative filtering", IEEE Transactions on Image Processing, vol. 16, no. 8, pp. 2080-2095, August 2007, hereinafter referred to as Dabov et al., is currently considered as one of the most successful denoising algorithms. In BM3D, similar image patches, i.e. blocks, are grouped and stacked into 3-D arrays called "groups", which are then collaboratively filtered. The collaborative filtering includes three steps: 3-D linear transform, shrinkage in transform-domain, and 3-D inverse transform. As it exploits both within-patch local correlations and between patch similarities, the 3-D transform often generates a highly sparse representation of the true signal and the noise can be effectively removed by shrinkage.

Various improvements over BM3D have been proposed. Shape Adaptive BM3D was introduced in K. Dabov, A. Foi, V. Katkovnik, and K. Egiazarian, "A Nonlocal and Shape-Adaptive Transform-Domain Collaborative Filtering", Proc. 2008 Int. Workshop on Local and Non-Local Approximation in Image Processing, LNLA 2008, Lausanne, Switzerland, 2008, which applies a Shape-Adaptive DCT (Discrete Cosine Transformation) for within-patch de-correlation. PCA (Principal Component Analysis) on adaptive-shape neighborhoods was proposed in K. Dabov, A. Foi, V. Katkovnik, and K. Egiazarian, "BM3D Image Denoising with Shape-Adaptive Principal Component Analysis", Proc. Workshop on Signal Processing with Adaptive Sparse Structured Representations (SPARS'09), Saint-Malo, France, April 2009. A method applying adaptive block-match thresholds is presented in Y. S. Zhang et al., "BM3D Denoising Algorithm with Adaptive Block-Match Thresholds", 2012, Applied Mechanics and Materials, vol 229-231, pp 1715-1720, November 2012. O. Pakdelazar1 and G. Rezai-rad, "Improvement of BM3D algorithm and Employment to satellite and CFA images Denoising", International Journal of Information Sciences and Techniques (IJIST) Vat No. 3, pp 23-33, November 2011, changes BM3D algorithm parameter values according to noise level. A Smooth Sigmoid-Based Shrinkage is combined with BM3D in M. Poderico, S. Parrilli, G. Poggi, L. Verdoliva "Sigmoid Shrinkage for BM3D denoising algorithm", 2010 IEEE International Workshop on Multimedia Signal Processing (MMSP), 423-426. BM3D and its variations have demonstrated a performance beyond the abilities of most modern alternatives.

Despite its excellent results, BM3D still has room for improvements. Image details and sharp edges, such as text in document images are challenging, as they usually do not produce sparse representations under the linear transformations. As a result, noise near the edges cannot be effectively removed and various artifacts such as ringing and blurring can be introduced. In this disclosure, provided is a Multiple Layer BM3D (MLBM3D) denoising algorithm. The algorithm applies a three layer model to decompose a high contrast patch. The model includes a top layer, a bottom layer, and a binary mask layer which controls switching between the content layers, i.e. the top and bottom layers. The top and bottom layers are collaboratively filtered and then combined. As the top and bottom layers are typically smooth and of low contrast, they can be effectively modeled by sparse representations. Consequently, image details and sharp edges can be retained with more fidelity.

INCORPORATION BY REFERENCE

R. C Gonzalez, R. E. Woods., "Digital Image Processing", Prentice Hall, N.J., 2008;

Vladimir Katkovnik, Alessandro Foi, Karen Egiazarian, Jaakko Astola, "From local kernel to nonlocal multiple-model image denoising", Journal International Journal of Computer Vision, Vol. 86, Issue 1, pp 1-32 January 2009;

K. Dabov, A. Foi, V. Katkovnik, and K. Egiazarian, "Image denoising by sparse 3-D transform-domain collaborative filtering", IEEE Transactions on Image Processing, vol. 16, no. 8, pp. 2080-2095, August 2007;

K. Dabov, A. Foi, V. Katkovnik, and K. Egiazarian, "A Nonlocal and Shape-Adaptive Transform-Domain Collaborative Filtering", Proc. 2008 Int. Workshop on Local and Non-Local Approximation in Image Processing, LNLA 2008, Lausanne, Switzerland, 2008;

K. Dabov, A. Foi, V. Katkovnik, and K. Egiazarian, "BM3D Image Denoising with Shape-Adaptive Principal Component Analysis", Proc. Workshop on Signal Processing with Adaptive Sparse Structured Representations (SPARS'09), Saint-Malo, France, April 2009;

Y. S. Zhang et al., "BM3D Denoising Algorithm with Adaptive Block-Match Thresholds", 2012, Applied Mechanics and Materials, Vol. 229-231, pp 1715-1720, November 2012;

O. Pakdelazar1 and G. Rezai-rad, "Improvement of BM3D algorithm and Employment to satellite and CFA images Denoising", International Journal of Information Sciences and Techniques (IJIST) Vol. 1, No. 3, pp 23-33, November 2011;

M. Poderico, S. Parrilli, G. Poggi, L. Verdoliva "Sigmoid Shrinkage for BM3D denoising algorithm", 2010 IEEE International Workshop on Multimedia Signal Processing (MMSP), 423-426;

Ricardo de Queiroz, Robert Buckley, Ming.Xu, "Mixed Raster Content (MRC) Model for Compound Image Compression", Visual Communications and Image Processing '99, December 1998;

Nobuyuki Otsu, "A threshold selection method from gray-level histograms". IEEE Trans. Sys., Man., Cyber. 9 (1): 62-66, 1979; and Marc Lebrun, "An Analysis and Implementation of the BM3D Image Denoising Method", Image Processing On Line, Aug. 8, 2012, are incorporated herein by reference in their entirety.

BRIEF DESCRIPTION

In one embodiment of this disclosure, described is a computer implemented MLBM3D (Multiple Layer Block Matching 3D Filtering) method of denoising an image including high contrast regions comprising: a) receiving a noisy image; b) generating a plurality of blocks covering the noisy image; c) selecting one of the plurality of r blocks as a reference block and grouping other blocks including similar image representations with the selected reference block to form a block cluster; d) collaboratively filtering the block cluster to from a single-layer estimate of the block cluster; e) classifying the block cluster as one of a single-layer block cluster and a multi-layer block cluster based on the single-layer estimate; f) for a multi-layer block cluster, decompose each of the blocks associated with the multi-layer block cluster into multiple layers; g) collaboratively filtering at least two of the multiple layers to form at least two, respective, filtered block layers; h) assembling the filtered block layers to form a multi-layer estimate of the block cluster; i) performing steps c)-h) for a plurality of the reference blocks; and j) aggregating the single-layer estimates of the classified single-layer block clusters and the multiple-layer estimates of the classified multi-layer block clusters to form a denoised image representation of the noisy image.

In another embodiment of this disclosure, described is an image processing system comprising a controller configured to receive a digital version of an image including high contrast regions, the controller configured to execute instructions to perform a MLBM3D (Multiple Layer Block Matching 3D Filtering) method of denoising the digital version of the image comprising: a) receiving a noisy image; b) generating a plurality of blocks covering the noisy image; c) selecting one of the plurality of blocks as a reference block and grouping other blocks including similar image representations with the selected reference block to form a block cluster; d) collaboratively filtering the block cluster to from a single-layer estimate of the block cluster; e) classifying the block cluster as one of a single-layer block cluster and a multi-layer block cluster based on the single-layer estimate; f) for a multi-layer block cluster, decompose each of the blocks associated with the multi-layer block cluster into multiple layers; g) collaboratively filtering at least two of the multiple layers to form at least two, respective, filtered block layers; h) assembling the filtered block layers to form a multi-layer estimate of the block cluster; i) performing steps c)-h) for a plurality of the reference blocks; and j) aggregating the single-layer estimates of the classified single-layer block clusters and the multiple-layer estimates of the classified multi-layer block clusters to form a denoised image representation of the noisy image.

In still another embodiment of this disclosure, described is a computer program product comprising a non-transitory recording medium storing instructions, which when executed on a computer cause the computer to perform a MLBM3D (Multiple Layer Block Matching 3D Filtering) method of denoising an image including high contrast regions comprising: a) receiving a noisy image; b) generating a plurality of blocks covering the noisy image; c) selecting one of the plurality of blocks as a reference block and grouping other reference blocks including similar image representations with the selected reference block to form a block cluster; d) collaboratively filtering the block cluster to from a single-layer estimate of the block cluster; e) classifying the block cluster as one of a single-layer block cluster and a multi-layer block cluster based on the single-layer estimate; f) for a multi-layer block cluster, decompose each of the blocks associated with the multi-layer block cluster into multiple layers; g) collaboratively filtering at least two of the multiple layers to form at least two, respective, filtered block layers; h) assembling the filtered block layers to form a multi-layer estimate of the block cluster; i) performing steps c)-h) for a plurality of the reference blocks; and j) aggregating the single-layer estimates of the classified single-layer block clusters and the multiple-layer estimates of the classified multi-layer block clusters to form a denoised image representation of the noisy image.

DETAILED DESCRIPTION

As discussed in the background section, Block Matching and 3-D Filtering (BM3D) is currently considered one of the most successful denoising algorithms. Despite its excellent results, BM3D still has room for improvements. Image details and sharp edges, such as text in document images are challenging, as they usually do not produce sparse representations under the linear transformations associated with BM3D. As a result, various artifacts such as ringing and blurring can be introduced.

This disclosure provides an image denoising method and system including a Multiple Layer BM3D (MLBM3D) denoising algorithm. The basic idea is to decompose image patches, i.e. blocks, that contain high contrast details into multiple layers, and subsequently collaboratively filtering each layer separately.

The MLBM3D algorithm includes an initial Basic Estimation step and a subsequent Final Estimation step. The Basic Estimation step is identical to the Basic Estimation step provided by BM3D as described in Dabov et al. In the Final Estimation step, image groups are determined to be single-layer or multi-layer. A single-layer group is filtered in the same manner as provided by BM3D. For a multi-layer group, each image patch, i.e. block, within the group is decomposed with a three-layer model. All the top layers in the group are stacked and collaboratively filtered. In addition, all the bottom layers in the group are stacked and collaboratively filtered. The filtered top and bottom layers are reassembled to form the estimation of the blocks. The final estimation of the image is obtained by aggregating estimations of all blocks, including both single-layer estimations and multi-layer estimations. The disclosed MLBM3D method and system provides excellent results, particularly for images including high contrast edges.

Introduction to BM3D

Figure 1:
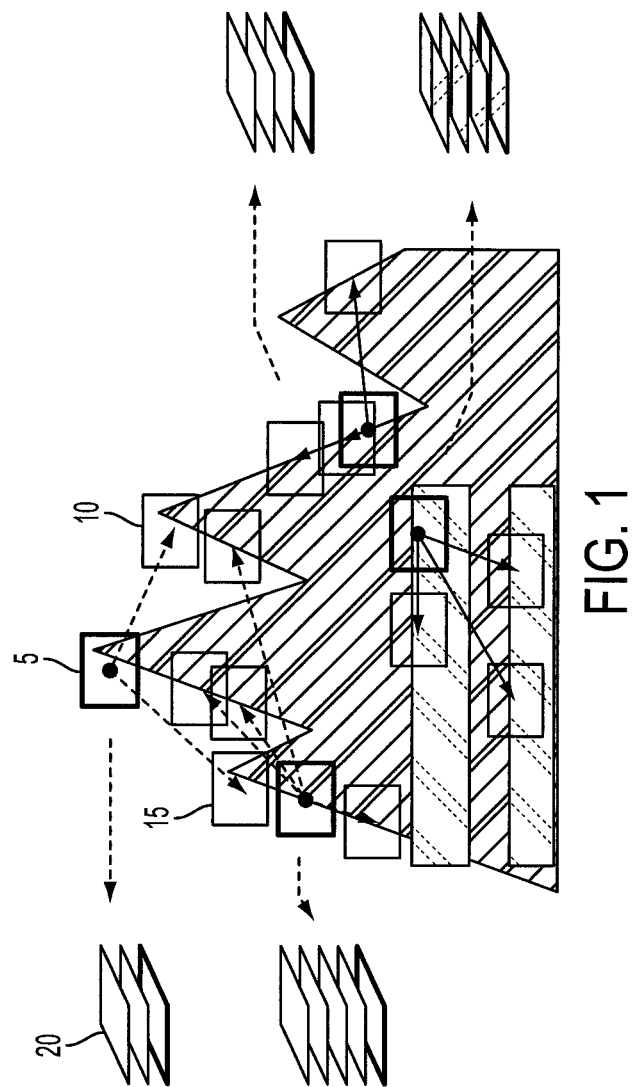
FIG. 1 is an example of block grouping in an artificial image, where for each reference block (thick borders) there exists perfectly similar blocks, as shown in Dabov et al.

A BM3D algorithm as described in Dabov et al. includes two steps: Basic Estimation and Final Estimation. Each step further includes two sub-steps: Block-wise estimation and Aggregation. In Block-wise estimation, a noisy input image is processed by successively extracting reference blocks from the noisy image. The blocks similar to the reference block are grouped and collaboratively filtered. As disclosed in Dabove et al., FIG. 1 illustrates the process of grouping where a reference block includes a thick border, such as block 5, and similar blocks are represented with thinner borders, such as blocks 10 and 15, which provide block group 20. During aggregation, the image is estimated by a weighted average of all of the obtained block-wise estimates of overlapping blocks. The BM3D algorithm as described in Dabov et al., is provided below:

Step 1: Basic Estimate.
  a) Block-wise estimates. For each block in the noisy image, perform the following:
   i) Grouping. Find blocks that are similar to the currently processed block, i.e. reference block, and then stack the reference block and similar blocks together to form a 3D array, i.e. group.
   ii) Collaborative hard-thresholding. Apply a 3D transform to the formed group, attenuate the noise by hard-thresholding of the transform coefficients, invert the 3D transform to produce estimates of all grouped blocks, and return the estimates of the blocks to their original positions.
  b) Aggregation. Compute a basic estimate of the true-image, i.e. noiseless original image, by weighted averaging all of the obtained block-wise estimates for overlapping blocks.

Step 2: Final estimate: using the basic estimate, perform improved grouping and collaborative Wiener filtering.
  a) Block-wise estimates. For each block, perform the following:
   i) Grouping. Use block matching within the basic estimate to find the locations of the blocks similar to the currently processed reference block. Using these locations, form two groups, i.e. 3D arrays, one group from the noisy image and one group from the basic estimate.
   ii) Collaborative Wiener filtering. Apply a 3D transform to both the noisy image block group and the basic estimate block group. Perform Wiener filtering on the noisy image block group using the energy spectrum of the basic estimate as the true (pilot) energy spectrum. Produce estimates of all grouped blocks by applying the inverse 3D transform to the filtered coefficients and return the estimates of the blocks to their original positions.
  b) Aggregation. Compute a final estimate of the true image by aggregating all of the obtained local estimates using a weighted average.

Proposed Multi-Layer BM3D Algorithm

Provided below are further details of an exemplary image denoising method and system including a MLBM3D denoising algorithm, according to this disclosure. The basic idea of the MLBM3D algorithm is to decompose image patches that contain high contrast details into multiple layers, and collaboratively filter each of the layers separately. More specifically, according to an exemplary embodiment a model similar to the one disclosed in Ricardo de Queiroz, Robert Buckley, Ming.Xu, "Mixed Raster Content (MRC) Model for Compound Image Compression", Visual Communications and Image Processing '99, December 1998, for Mixed Raster Content compression is adopted, where the model represents a raster image with three-layers: a binary mask layer, top layer and bottom layer.

Similarly to BM3D, the MLBM3D algorithm also includes an initial Basic Estimation step and a subsequent Final Estimation step. The Basic Estimation step is identical to the Basic Estimation step of a BM3D algorithm, as described in Dabov et al. During the Final Estimation step, image groups are determined to be single-layer or multi-layer. A single-layer group is filtered exactly as a group in BM3D, as described in Dabov et al. For a multi-layer group, each image patch, i.e. block, within the group is decomposed using a three-layer model. All the top layers in the group are stacked and collaboratively filtered, and all the bottom layers in the group are stacked and collaboratively filtered. The filtered top and bottom layers are reassembled to form an estimation of the blocks. The final estimation of the image is obtained by aggregating estimations of all blocks, including both single-layer blocks and multi-layer blocks.

The MLBM3D algorithm incorporated into the exemplary method and systems of denoising an image provided herein is developed under the assumption of iid (independent and identically distributed) Gaussian noise, but is adaptable to other noise models.

Three-Layer Model

Figure 2:
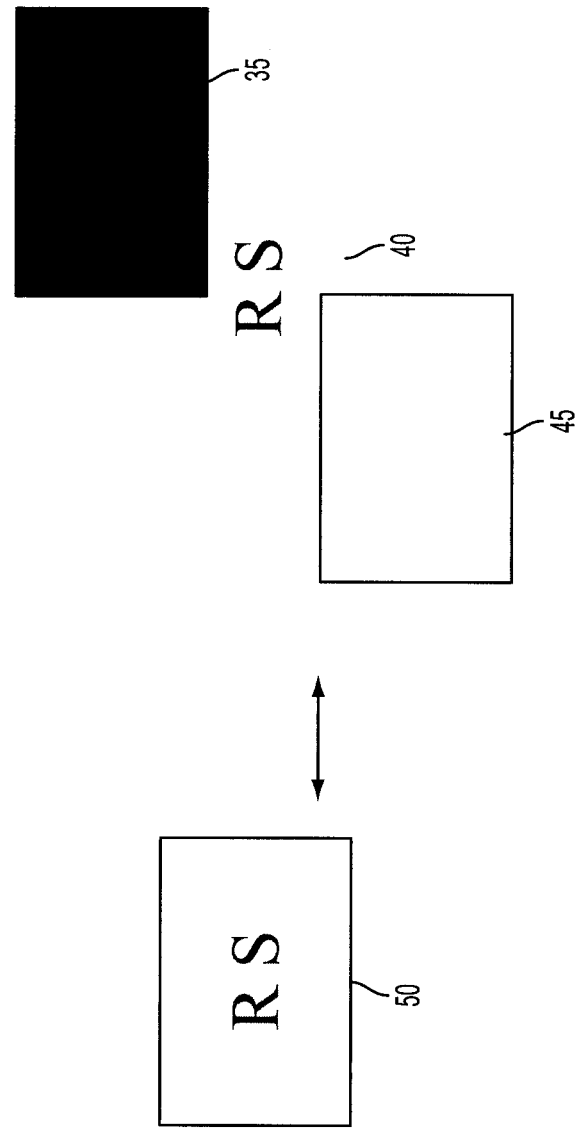
FIG. 2 illustrates an example three-layer image model according to an exemplary embodiment of this disclosure.

The three-layer model adopted for the MLBM3D algorithm disclosed is similar to the model provided in a Mixed Raster Content model as described in Ricardo de Queiroz, Robert Buckley, Ming.Xu, "Mixed Raster Content (MRC) Model for Compound Image Compression", Visual Communications and Image Processing '99, December 1998. The mask layer of the three-layer model describes how to reconstruct the final images from the other two layers, i.e. the top layer and bottom layer. If the mask layer pixel value is 1, the corresponding pixel from the top layer is selected for the final image; if the mask layer pixel value is 0, then the corresponding pixel from the bottom layer is selected. An illustration of the imaging model is shown in FIG. 2, where the top layer 35 is essentially poured through the mask plane 40 onto the bottom layer 45, producing a resulting image 50.

Each of the top and bottom layers is composed of two parts: an essential part and a redundant part. The essential part includes pixels that actually contribute to the final reconstruction, i.e., the top layer pixels corresponding to mask layer pixel values equal to 1 and the bottom layer pixels corresponding to mask layer pixel values equal to 0. Other pixels which are not essential are considered redundant. As the redundant pixels do not have a direct contribution to the reconstruction results, their values can be chosen under other considerations, for example, for minimizing bit rates during image compression processes.

Figure 3:
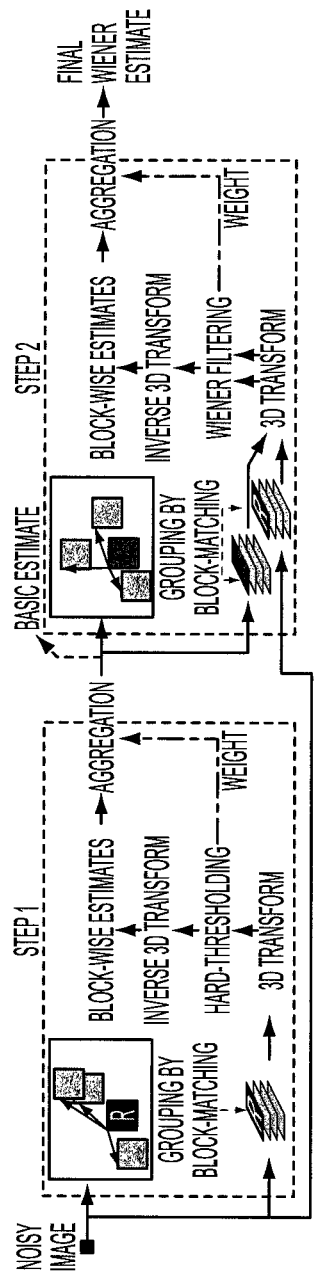
FIG. 3 is a flowchart of a BM3D (Block Matching and 3D Filtering) image denoising algorithm as described in Dabov et al.

FIG. 3 is a flowchart of a BM3D image denoising algorithm as described in Dabov et al.

Figure 4:
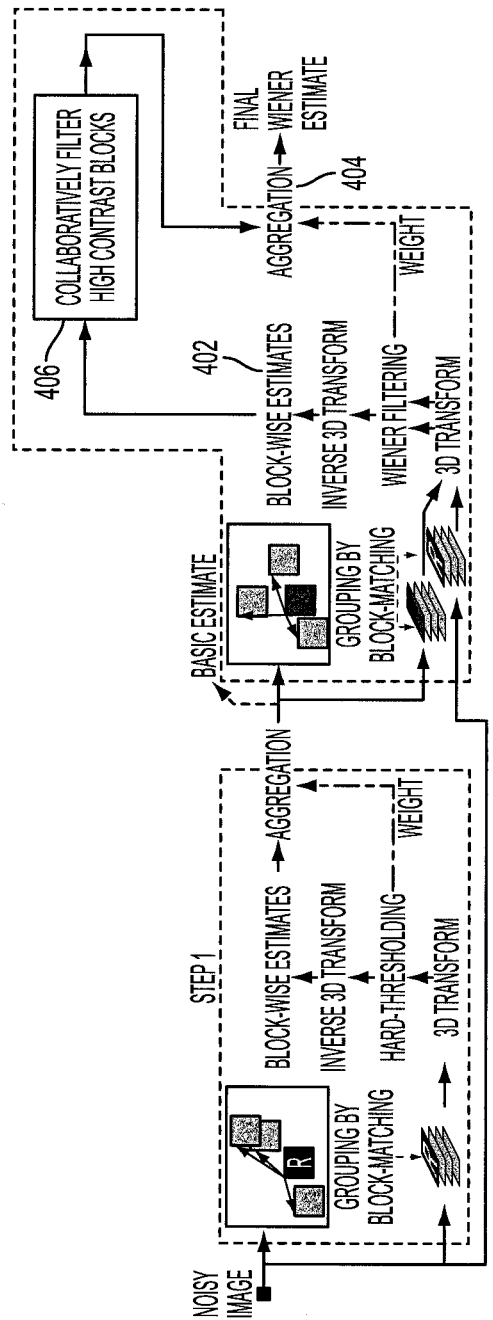
FIG. 4 is a flowchart of an image denoising method including BM3D and collaboratively filtering high contrast blocks according to an exemplary embodiment of this disclosure.

FIG. 4 illustrates a flow chart of MLBM3D denoising method according to an exemplary embodiment of this disclosure. As shown in FIG. 4, step 1 is identical to step 1 of a MB3D denoising method as described in Dabov et al., and step 2 of the MLBM3E method is a modification of step 2 of the MB3D denoising method as described in Dabov et al., where step 2 is modified to include the step of "collaboratively filter high contrast blocks" prior to Aggregation. Notably, some of the description, which follows, addressing step 1 of the disclosed MLBM3E denoising method is provided by Dabov et al., as well as portions of step 2 of the disclosed MLBM3D denoising method which are similar to step 2 of the BM3D denoising method described in Dabov et al.

Figure 5:
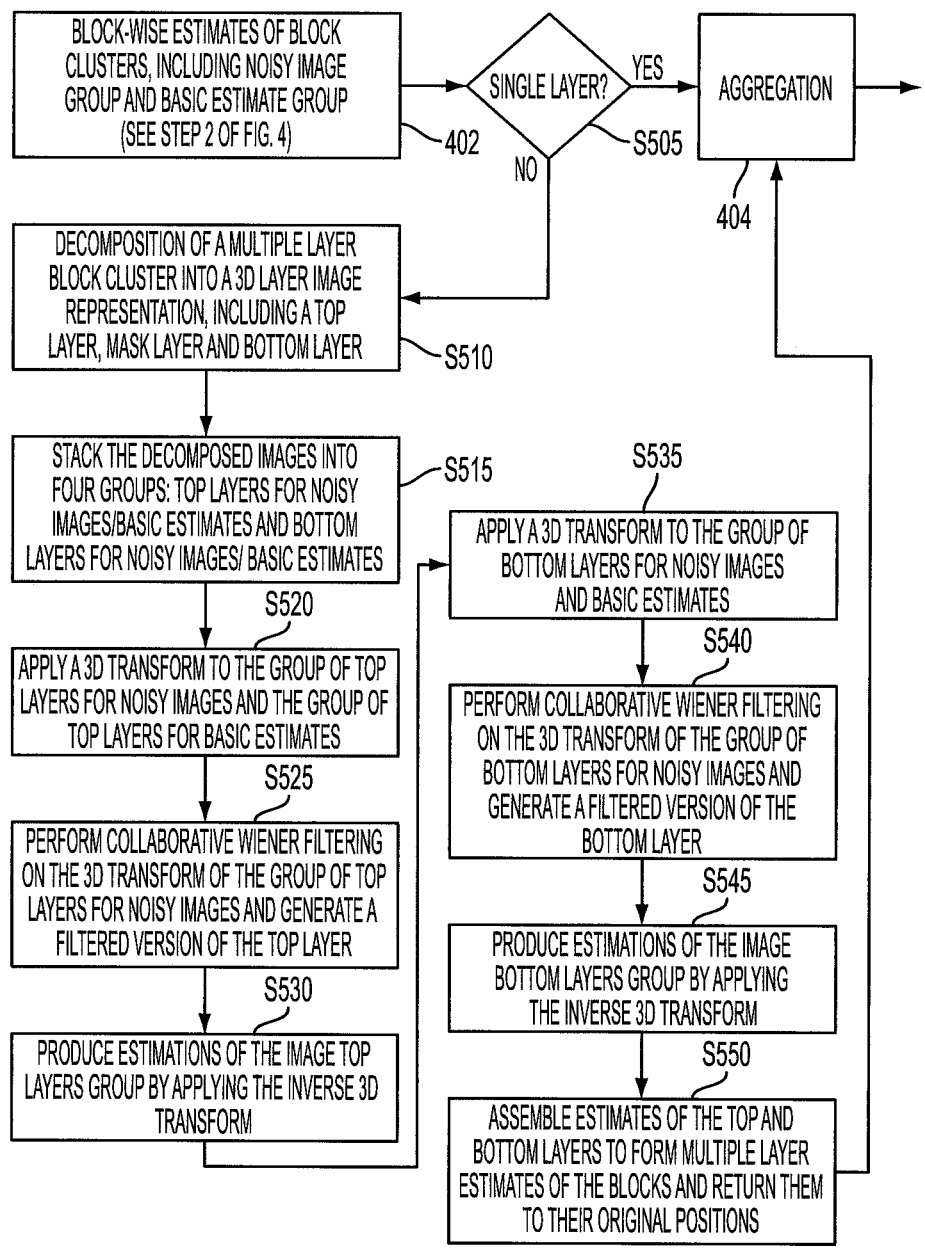
FIG. 5 is a flowchart of a method of collaboratively filtering high contrast blocks according to an exemplary embodiment of this disclosure.

With reference to FIG. 5, illustrated is a flow chart of a MLBM3D process to collaboratively filter high contrast blocks according to an exemplary embodiment of this disclosure.

As shown, BM3D block-wise estimates of block groups, i.e. clusters, including a noisy image group and basic estimate group are used, initially at S505 to determine if the cluster is a single layer.

If it is determined the cluster is a single layer, aggregation is performed no different than the BM3D process of Dabov et al.

If it is determined the cluster is not a single layer, then steps S510, S515, S520, S525, S530, S535, S540, S545 and S550 are performed, prior to aggregation, according to the MLBM3D image denoising method and system disclosed herein.

At S510, the method performs a decomposition of a multiple layer block cluster into a 3D layer image representation including a top layer, a mask layer and a bottom layer Next, at S515, the method stacks the decomposed images into four groups: top layers for noisy image/basic estimates, and bottom layers for noisy images/basic estimates.

Next, at S520, the method applies a 3D transform to the group of top layers for noisy images and the group of top layers for basic estimates.

Next, at S525, the method performs collaborative Wiener filtering on the 3D transform of the group of top layers for noisy images and generates a filtered version of the top layers.

Next at S530, the method produces estimations of the image top layers group by applying the inverse 3D transform.

Next, at S535, the method applies a 3D transform to the group of bottom layers for noisy images and basic estimates.

Next, at S540, the method performs collaborative Weiner filtering on the 3D transform of the group of bottom layers for noisy images and generates a filtered version of the bottom layers.

Next, at S545, the method produces estimates of the image bottom layers group by applying the invers 3D transform.

Next, at S550, the method assembles estimates of the top and bottom layers to form multiple layer estimates of the blocks and returns them to their original positions.

Finally, aggregation is performed as shown in FIG. 4, where the method aggregates all of the obtained local estimates using a weighted average.

Figure 6:
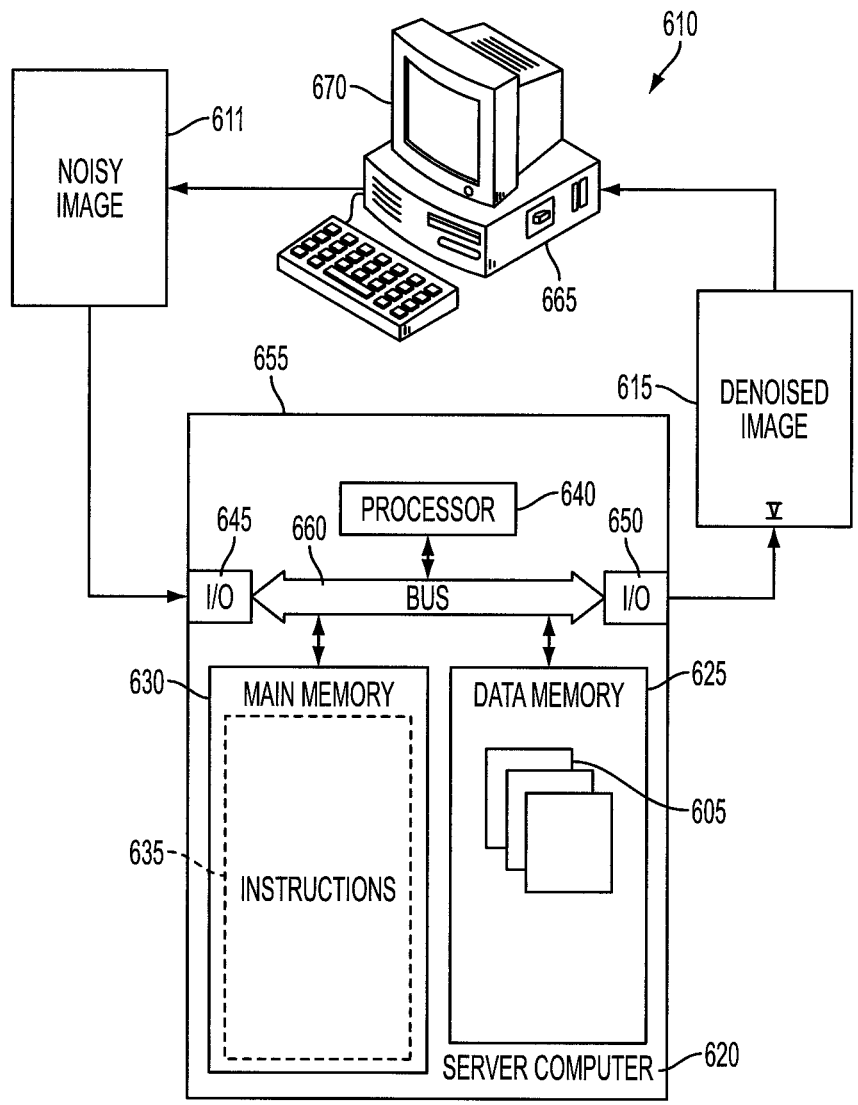
FIG. 6 is a block diagram of an image denoising system including collaborative filtering of high contrast blocks according to an exemplary embodiment of this disclosure.

With reference to FIG. 6, an exemplary environment in which the image denoising method and system operates is shown. The system 610 comprises one or more computing devices, such as the illustrated server computer, and includes memory, here illustrated as main memory 630 and data memory 625, a processor 640, such as the images 605 being processed by the exemplary method(s) as well as the processed data.

The network interfaces 645 and 650 allows the computer to communicate with other devices via a wired or wireless links, such as computer network 670, e.g. a local area network (LAN), wide area network (WAN), such as the internet, telephone line, wired connection, or a combination thereof, and may comprise a modulator/demodulator (MODEM).

Images to be denoised 611 are input to the system 610 from a source of images, such as a general purpose or specific purpose computing device, such as a PC, laptop, camera, cell phone, or the like, or from a non-transitory memory storage device, such as a flash drive, disk, portable hard drive, camera memory stick, or the like. In the exemplary embodiment, the source is a cell phone, smart phone or other mobile image capturing device.

Images for denoising 611 may be received by the system 610 in a convenient file format, such as JPEG, TIFF, GIF, JBIG, BMP, or other common file formats used for images and which may optionally be converted to another suitable format prior to processing. Images may be individual photographs, video images, three-dimensional images, computer's CPU, and one or more network interfaces (I/O) 645 and 650 for communicating with other devices, all communicatively linked by a PC, such as a desktop, a laptop, a palmtop computer, portable digital assistant (PDA), digital camera, server computer, cellular telephone, tablet computer, or other computing device(s) capable of executing instructions for performing the exemplary method(s).

The digital processor 640 can be variously embodied, such as by a single core processor, a dual core processor (or more generally by a multiple-core processor), a digital processor and cooperating math coprocessor, a digital controller, or the like. In general, any device capable of implementing the flow chart shown in FIGS. 4 and 5, and further described herein can be used as the processor.

The memory or memories 630 and 625 may represent any type of non-transitory computer readable medium such as random access memory (RAM), read only memory (ROM), magnetic disk or tape, optical disk, flash memory, or holographic memory. Memory 630 may store instructions for the operation of a server computer as well as for performing the exemplary method(s) for denoising an image described herein. Memory 625 stores combined images which include text/graphics as well as a photograph, and the like. In general, each input noisy digital image includes image data for an array of pixels forming an image. The image data may include colorant values, such as grayscale values, for each of a set of color separations, such as RGB, or be expressed in another color space in which different colors can be represented. In general, "grayscale" refers to the optical density value of any single color separation, however expressed (RGB, L*a*b*, YCbCr, etc.). The exemplary methods and systems are applicable to monochrome images as well as multicolor images.

Various aspects of the disclosed MLBM3D image denoising method and system are now described in greater detail.

Step 1: Basic Estimate a) Block-wise estimates. For each block in the noisy image, perform the following:
   i) Grouping. Find blocks that are similar to the currently processed reference block and then stack all blocks together in a 3D array, i.e. group.
   ii) Collaborative hard-thresholding. Apply a 3D transform to the formed group, attenuate the noise by hard-thresholding of the transform coefficients, invert the 3D transform to produce estimates of all grouped blocks, and return the estimates of the blocks to their original positions.

b) Aggregation. Compute a basic estimate of the true-image by weighted averaging all of the obtained block-wise estimates of overlapping blocks.

Step 2. Final Estimate a) Block-wise estimates. For each block, perform the following:
   i) Grouping. Perform block matching using the basic estimate of step 1 to find the locations of blocks similar to the currently processed reference block. For purposes of this disclosure, the set of locations of similar blocks is referred to as a "block cluster" or a "cluster". For each cluster, two groups are formed, a noisy image block group and a basic estimate block group.

ii) Collaborative Wiener filtering. Apply a 3D transform to both the noisy image block group and the basic estimate block group. Then perform Wiener filtering on the noisy image block group using the energy spectrum of the basic estimate block group as the true (pilot) energy spectrum. Produce estimates of all grouped blocks by applying the inverse 3D transform. The result is referred to as a "single-layer estimate" since it is the estimate of the block without three layer decomposition. The single-layer estimate has several usages: a) it is used for sub-step iii below for cluster classification; b) it is used as the estimate of the block if the cluster is classified as single-layer in sub-step iv below; and c) it is used for generating mask layers in sub-step v below for multi-layer clusters.

iii) Block cluster classification. The block clusters are classified as single-layer or multi-layer.

iv) For classified single-layer clusters, sub-step v below is skipped and the single-layer estimates of the blocks are returned to their original positions.

v) For each classified multi-layer cluster, the following steps are performed:
 a) Decomposition: Decompose each image patch, i.e. block, in the noisy image block group and the basic estimation group into a three layer representation, i.e. top layer, bottom layer and mask layer.
 b) Stacking: Stack the decomposed images into four groups: top layers for noisy images, top layers for basic estimates, bottom layers for noisy images, and bottom layers for basic estimates.
 c) Collaborative Wiener filtering of top layers and bottom layers. For the top layers, apply a 3D transform on both the noisy image and basic estimation groups. Perform Wiener filtering on the noisy image group using the energy spectrum of the basic estimation group as the true energy spectrum. Produce estimates of all top layers by applying the inverse 3D transform on the filtered coefficients. The bottom layers are processed in a similar fashion to produce estimates of all bottom layers by applying an inverse 3D transform on the filtered coefficients.
 d) Block assembly: Assemble the estimates of top and bottom layers to form multi-layer estimates of the blocks, and return them to their original positions.

b) Aggregation. Compute a final estimate of the true image by aggregating all of the obtained local estimates using a weighted average.

The sub-steps of Block cluster classification, Decomposition and Block assembly are now further explained below.

Block Cluster Classification

Not all blocks benefits from multi-layer decomposition. A block with uniform pixel values, a single mode, or a narrow dynamic range is generally not a good candidate. Further excluded are blocks whose decomposition results in one of the layers with very few pixels, as their decompositions are often not very stable. Specifically, the blocks within the cluster may have substantially different decomposition results.

To determine if a cluster is single-layer or multi-layer, the single-layer estimates are used. As a cluster is composed of similar blocks, it is often unnecessary to utilize all the blocks during classification. For example, during one experiment conducted, only one block, the reference block, was used. The dynamic range of the single-layer estimate of a block is first examined. If the estimate is below a predetermined threshold, e.g. 32/255, the cluster is considered to be single-layer. Otherwise, another threshold is determined using Otsu's method, which segments the block into two levels. See Nobuyuki Otsu, "A threshold selection method from gray-level histograms". IEEE Trans. Sys., Man., Cyber. 9 (1): 62-66, 1979. According to Otsu's method, two quantities are measured. A first measured quantity is the minority ratio, which is defined as:

$$\gamma = \text{Min}(\omega_0, \omega_1)/(\omega_0 + \omega_1), \quad (1)$$

where $\omega_1$, and $\omega_1$ are the number of pixels for each level, respectively. The other measured quantity is the effectiveness metric of the thresholding, which is defined as:

$$\eta = \sigma^2_B / \sigma^2_T \quad (2)$$

where $\sigma^2_B$ and $\sigma^2_T$ are the between-variance and the total variance, respectively. A cluster is classified as multi-layer if both measured quantities exceed their respective thresholds, e.g., 4/64 for $\gamma$, and 0.8 for $\eta$. Otherwise, it is considered a single-layer.

Decomposition

During this sub-step, the noisy image blocks and basic estimate blocks for a multi-layer cluster are decomposed into their three-layer representations. A set of mask layers are first generated using the single-layer estimate blocks. Specifically, a threshold $t_i$ is determined for the i-th block using Otsu's method. The i-th mask is then produced as:

$$M_i(x,y) = 1; \text{ if } S_i(x,y) > t_i$$

$$0; \text{ otherwise.} \quad (3)$$

where $M_i(x, y)$ and $S_i(x, y)$ are the pixel values for the mask and single-layer estimate, respectively.

The masks are then used by corresponding noisy image blocks and basic estimate blocks for their three-layer decomposition. For each mask, four groups of blocks are generated: a group of top layers for noisy blocks, a group of bottom layers for noisy blocks, a group of top layers for basic estimate blocks, and a group of bottom layers for basic estimate blocks. The essential parts of the blocks can be readily determined:

$$N_i^{TOP}(x,y) = N_i(x,y); \text{ if } M_i(x,y) = 1$$

$$N_i^{BOT}(x,y) = N_i(x,y); \text{ if } M_i(x,y) = 0$$

$$B_i^{TOP}(x,y) = B_i(x,y); \text{ if } M_i(x,y) = 1$$

$$B_i^{BOT}(x,y) = B_i(x,y); \text{ if } M_i(x,y) = 0 \quad (4)$$

where $N_i(.,.)$ and $B_i(.,.)$ denote noisy patches, i.e. blocks and basic estimates, respectively, and the superscripts denote their corresponding top or bottom layers.

The pixel values associated with the redundant parts are selected as an attempt to produce highly sparse representations for the block in a transform domain. However, an optimum solution requires substantial computation. Consequently, a heuristic approach was adopted for implementation of the MLBM3D during experimentation. The redundant parts are first initialized with the mean values of their essential counterparts. Low-pass filtering is then applied to smooth out the transitions between the redundant and essential parts.

For the noisy image group of blocks, the newly created top and bottom layers have different noise spectrums relative to the original top and bottom layers. This is because the redundant parts produced are smooth and almost noise free. As the noise spectrum is a required part of the parameters used during the following Wiener filtering step, the noise spectrum needs to be recalculated, or the noise level adjusted for the noisy top and bottom layer blocks. During experiments, the latter approach was applied, where a zero mean iid Gaussian noise sequence with the same power as the noisy image was created. The noise was added to each redundant pixel in the noisy top and bottom layer blocks.

Block Assembly

The estimates of the top and bottom layers are assembled during this sub-step to form multi-layer estimates of the blocks. Specifically, for i-th block:

$$E(x,y) = E_i^{TOP}(x,y) \text{ if } M_i(x,y) = 1$$

$$E_i^{BOT}(x,y) \text{ otherwise}$$

where $E_i^{TOP}(.,.)$ and $E_i^{TOP}(.,.)$ are the estimates for the top and bottom layers, respectively, and $E_i(.,.)$ is the estimate of the block.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented MLBM3D (Multiple Layer Block Matching 3D Filtering) method of denoising an image including high contrast regions comprising:
   a) receiving a noisy image;
   b) generating a plurality of blocks covering the noisy image;
   c) selecting one of the plurality of blocks as a reference block and grouping other blocks including similar image representations with the selected reference block to form a block cluster;
   d) collaboratively filtering the block cluster to form a single-layer estimate of the block cluster;
   e) classifying the block cluster as one of a single-layer block cluster and a multi-layer block cluster based on the single-layer estimate;
   f) for a multi-layer block cluster, decompose each of the blocks associated with the multi-layer block cluster into multiple layers;
   g) collaboratively filtering at least two of the multiple layers to form at least two, respective, filtered block layers;
   h) assembling the filtered block layers to form a multi-layer estimate of the block cluster;
   i) performing steps c)-h) for a plurality of the reference blocks; and
   j) aggregating the single-layer estimates of the classified single-layer block clusters and the multiple-layer estimates of the classified multi-layer block clusters to form a denoised image representation of the noisy image.

2. The computer-implemented MLBM3D method of denoising an image according to claim 1, wherein step i) performs steps c)-h) for all of the plurality of the reference blocks.

3. The computer-implemented MLBM3D method of denoising an image according to claim 1, wherein the received noisy image is associated with one or more of a mobile image capturing device, a fixed image capturing device, a scanned image, and a computer generated image representation file.

4. The computer-implemented MLBM3D method of denoising an image according to claim 1, wherein step b) generates a plurality of overlapping blocks covering the noisy image.

5. The computer-implemented MLBM3D method of denoising an image according to claim 1, wherein the multi-layer block clusters classified in step e) are associated with relatively high contrast multi-layer block clusters relative to the single layer block clusters classified in step e).

6. The computer-implemented MLBM3D method of denoising an image according to claim 1, wherein step f) decomposes each of the blocks associated with the multi-layer block cluster into a top layer, a bottom layer and a mask layer.

7. The computer implemented MLBM3D method of denoising an image according to claim 1, wherein step g) performs collaborative Weiner filtering at least two of the multiple layers to form at least two, respective, filtered block layers.

8. The computer-implemented MLBM3D method of denoising an image according to claim 1, wherein step e) applies thresholding to the single-layer estimate to classify the block cluster as one of a single-layer block cluster and a multi-layer block cluster.

9. The computer implemented MLBM3D method of denoising an image according to claim 1,
step a) further comprising:
    forming a BM3D basic estimate of a true-image associated with the noisy image, and
step b) further comprising:
    generating a plurality of reference blocks representative of blocks covering the BM3D basic estimate of the true-image associated with the noisy image.

10. The computer implemented MLBM3D method of denoising an image according to claim 9, wherein
step c) further comprising:
    forming the block cluster including a noisy image group and a basic estimate group;
step f) further comprising:
    stacking the decomposed cluster blocks into a top layer noisy image group, a top layer basic estimate group, a bottom layer noisy image group and a bottom layer basic estimate group; and
step g) further comprising:
    applying a 3D transform on the noisy image groups and the basic estimation groups, and Weiner filtering is applied to the noisy image group using an energy spectrum of the basic estimate.

11. An image processing system comprising:
a controller configured to receive a digital version of an image including high contrast regions, the controller configured to execute instructions to perform a MLBM3D (Multiple Layer Block Matching 3D Filtering) method of denoising the digital version of the image comprising:

a) receiving a noisy image;
b) generating a plurality of blocks covering the noisy image;
c) selecting one of the plurality of blocks as a reference block and grouping other blocks including similar image representations with the selected reference block to form a block cluster;
d) collaboratively filtering the block cluster to form a single-layer estimate of the block cluster;
e) classifying the block cluster as one of a single-layer block cluster and a multi-layer block cluster based on the single-layer estimate;
f) for a multi-layer block cluster, decompose each of the blocks associated with the multi-layer block cluster into multiple layers;
g) collaboratively filtering at least two of the multiple layers to form at least two, respective, filtered block layers;
h) assembling the filtered block layers to form a multi-layer estimate of the block cluster;
i) performing steps c)-h) for a plurality of the reference blocks; and
j) aggregating the single-layer estimates of the classified single-layer block clusters and the multiple-layer estimates of the classified multi-layer block clusters to form a denoised image representation of the noisy image.

12. The image processing system according to claim 11, wherein step i) performs steps c)-h) for all of the plurality of the reference blocks.

13. The image processing system according to claim 11, wherein the received noisy image is associated with one or more of a mobile image capturing device, a fixed image capturing device, a scanned image, and a computer generated image representation file.

14. The image processing system according to claim 11, wherein step b) generates a plurality of overlapping blocks covering the noisy image.

15. The image processing system according to claim 11, wherein the multi-layer block clusters classified in step e) are associated with relatively high contrast multi-layer block clusters relative to the single layer block clusters classified in step e).

16. The image processing system according to claim 11, wherein step f) decomposes each of the blocks associated with the multi-layer block cluster into a top layer, a bottom layer and a mask layer.

17. The image processing system according to claim 11, wherein step g) performs collaborative Weiner filtering at least two of the multiple layers to form at least two, respective, filtered block layers.

18. The image processing system according to claim 11, wherein step e) applies thresholding to the single-layer estimate to classify the block cluster as one of a single-layer block cluster and a multi-layer block cluster.

19. The image processing system according to claim 11,
step a) further comprising:
    forming a BM3D basic estimate of a true-image associated with the noisy image, and
step b) further comprising:
    generating a plurality of reference blocks representative of the BM3D basic estimate of the true-image associated with the noisy image.

20. The image processing system according to claim 19, wherein
step c) further comprising:
    forming the block cluster including a noisy image group and a basic estimate group;

step f) further comprising:
   stacking the decomposed cluster blocks into a top layer noisy image group, a top layer basic estimate group, a bottom layer noisy image group and a bottom layer basic estimate group; and step g) further comprising:
   applying a 3D transform on the noisy image groups and the basic estimation groups, and Weiner filtering is applied to the noisy image group using an energy spectrum of the basic estimate.

21. A computer program product comprising a non-transitory recording medium storing instructions, which when executed on a computer cause the computer to perform a MLBM3D (Multiple Layer Block Matching 3D Filtering) method of denoising an image including high contrast regions comprising:

a) receiving a noisy image;
  b) generating a plurality of blocks covering the noisy image;
  c) selecting one of the plurality of blocks as a reference block and grouping other blocks including similar image representations with the selected reference block to form a block cluster;
  d) collaboratively filtering the block cluster to form a single-layer estimate of the block cluster;
  e) classifying the block cluster as one of a single-layer block cluster and a multi-layer block cluster based on the single-layer estimate;
  f) for a multi-layer block cluster, decompose each of the blocks associated with the multi-layer block cluster into multiple layers;
  g) collaboratively filtering at least two of the multiple layers to form at least two, respective, filtered block layers;
  h) assembling the filtered block layers to form a multi-layer estimate of the block cluster;
  i) performing steps c)-h) for a plurality of the reference blocks; and
  j) aggregating the single-layer estimates of the classified single-layer block clusters and the multiple-layer estimates of the classified multi-layer block clusters to form a denoised image representation of the noisy image.

22. The computer program product according to claim 21, wherein step i) performs steps c)-h) for all of the plurality of the reference blocks.

23. The computer program product according to claim 21, wherein the received noisy image is associated with one or more of a mobile image capturing device, a fixed image capturing device, a scanned image, and a computer generated image representation file.

24. The computer program product according to claim 21, step a) further comprising:
   forming a BM3D basic estimate of a true-image associated with the noisy image, and step b) further comprising:
   generating a plurality of reference blocks representative of the BM3D basic estimate of the true-image associated with the noisy image.

25. The computer program product according to claim 24, step c) further comprising:
   forming the block cluster including a noisy image group and a basic estimate group;

step f) further comprising:
   stacking the decomposed cluster blocks into a top layer noisy image group, a top layer basic estimate group, a bottom layer noisy image group and a bottom layer basic estimate group; and step g) further comprising:
   applying a 3D transform on the noisy image groups and the basic estimation groups, and Weiner filtering is applied to the noisy image group using an energy spectrum of the basic estimate.

\* \* \* \* \*